May 19, 1942. T. SLONCZEWSKI ET AL 2,283,616

OSCILLOGRAPHIC METHOD OF FREQUENCY SETTING OR MEASUREMENT

Filed Aug. 3, 1940

INVENTORS: T. SLONCZEWSKI
F. R. STANSEL
BY
*Guy T. Morris*
ATTORNEY

Patented May 19, 1942

2,283,616

UNITED STATES PATENT OFFICE 2,283,616

OSCILLOGRAPHIC METHOD OF FREQUENCY SETTING OR MEASUREMENT

Thaddeus Slonczewski, Glen Head, N. Y., and Frank R. Stansel, Millburn, N. J., assignors to Bell Telephone Laboratories, Incorporated, New York, N. Y., a corporation of New York Application August 3, 1940, Serial No. 350,982

6 Claims. (Cl. 172—245)

This invention relates to an oscillographic method of frequency setting or measurement and more particularly to an interpolation method using a calibrated interpolation oscillator, whereby the frequency of the unknown oscillator may be accurately checked against the fixed frequency of the standard source at any desired point on its scale or the oscillator may similarly be set, as to frequency, at any desired point. Accordingly, the invention makes it possible to provide the complete calibration of a given unknown oscillator with the help of the wave of known frequency from a standard source and a calibrated interpolation oscillator.

It is an object of the invention to set or check a given unknown frequency, and especially at a relatively high frequency, with a facility and accuracy believed not capable of achievement by circuits of the prior art.

A subsidiary object is to accomplish the purpose expressed in the above object while using the inherently facile principle of oscilloscopic or oscillographic representation. It is contemplated, in the achievement of the objects of the invention, however otherwise stated, that the method be without limitation as to the particular significant frequency point so that the frequency checking or setting (that is calibration) may be accomplished through a continuous frequency range.

Since the introduction of the vacuum tube oscillator, as a common type of laboratory equipment, their frequencies have been checked throughout the audio and carrier frequency range by comparison against standard frequencies using the Lissajous figures produced on a cathode ray oscilloscope or oscillograph. By the use of these figures, frequency ratios of 1 to 1 and 2 to 1 and in general $n$ to 1 may be recognized and the oscillator may thus be set at finite multiples of the standard frequency. By providing standard frequencies of 100 cycles, 1000 cycles, 10,000 cycles and 100,000 cycles, etc., these finite multiples cover a large portion of the calibration points required. Additional calibration points may be had for using other frequency ratios such as indicated by the 3 to 2 pattern, 4 to 5 pattern, etc., but these patterns are not as easy to recognize as the patterns due to finite multiples and are not generally of much practical importance.

However, occasions arise in which an oscillator must be set at a frequency which bears no simple relation to any standard frequency. For example, the measurement of the transmission characteristic of a filter may require data to be taken at 678,493 cycles. Or during a test a peak may be located and it may be desired to know the exact frequency at which this peak occurs. When the oscillator can be calibrated at two or more points in the vicinity of this frequency, a curve may be drawn between these calibrated points and the setting for the desired frequency (or the frequency at the experimentally determined setting) may be read from the curve. The error introduced by interpolating (or extrapolating) frequencies from such a curve depends entirely upon the linearity of the oscillator scale in this region which may, or may not, be sufficient for the accuracy required.

While the above method has been widely used in the past, specially in the lower carrier frequency range where calibration points may be readily obtained every 100 or 500 cycles, occasions are constantly arising when greater accuracy is required. One such occasion has been in the measurement of the characteristics of crystals used as filter elements. Here the desired characteristics are computed from the frequency at which various resonances and anti-resonances occur, and until recently, the errors, even though small, due to reading the frequency from a calibration curve has often been the cause of inconsistent results. More precise methods of frequency measurement are available, but these methods have heretofore involved the use of a large amount of apparatus and have been too complicated to be readily adapted to routine use in the laboratory.

During the search for a simpler and less expensive method of precision frequency measurement, it was suggested that the desired results might be obtained by comparing the difference between the oscillator frequency and its nearest calibrated frequency with another oscillator whose frequency was equal to this difference.

Further study showed that essentially this could be done by the use of patterns on a cathode ray oscilloscope or oscillograph in much the same manner as the Lissajous patterns are made. It was in this way that the present invention was developed.

To understand the application of the circuit of the invention let us first consider the wave shape of a complex wave composed of two frequencies each having the same amplitude. Such a wave may be expressed mathematically as $$A \sin 2\pi pt + A \sin 2\pi qt$$

Figure 2:
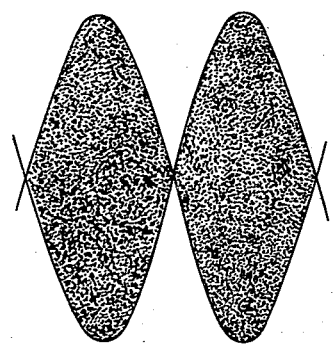
Figs. 2 and 3 illustrate, in two slightly different forms, the wave form evolved by operation on the waves from the unknown and interpolation oscillators in preparation for the comparison of such waves with the wave from the standard oscillator in the oscilloscope or oscillograph; and, Fig. 4 illustrates a practical system by means of which the invention may be carried out.

By simple trigonometric transformations, this expression may be changed into the form $$2A \cos 2\pi \frac{p-q}{2} t \sin 2\pi \frac{p+q}{2} t$$

which shows that the individual oscillations of the wave may be considered as having the frequency $(p+q)/2$ while the envelope of the wave may be considered as two cosine waves of the frequency $(p-q)/2$ each 180 degrees out of phase with the other. Such a wave is shown in Fig. 2. In this figure the individual oscillations of frequency $(p+q)/2$ are of such high frequency that the individual oscillations can not be distinguished. The peaks of this wave occur $p-q$ times each second and the envelope of the complex wave may be considered as having a frequency of $p-q$ cycles.

Figure 3:
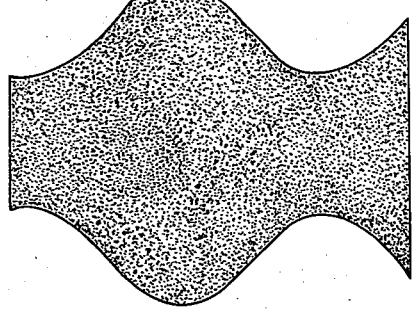

When the two components of such a wave are of unequal amplitude, the mathematical analysis while possible is not as simple, but by observing such a wave in the oscilloscope it may be seen that as the amplitude of one component is changed the frequency of the envelope remains the same. With said components of unequal amplitude, however, the envelope does not come down to the zero axis and the wave appears quite similar to but not identical with the well-known modulated radio frequency wave. Such a wave is shown in Fig. 3.

Now let us assume that we wish to set an oscillator at 323,383 cycles. If we connect in series with this oscillator another oscillator whose frequency is set at 11,383 cycles, the frequency of the envelope of the composite wave will be the difference of these two frequencies, that is 312,000 cycles. Since this difference frequency is a multiple of 1,000 cycles, it is possible to obtain a pattern similar to Fig. 2 or Fig. 3 (depending on whether the amplitudes are equal or unequal) by comparing the composite wave with a 1,000 cycle standard on an oscilloscope or oscillograph.

Figure 1:
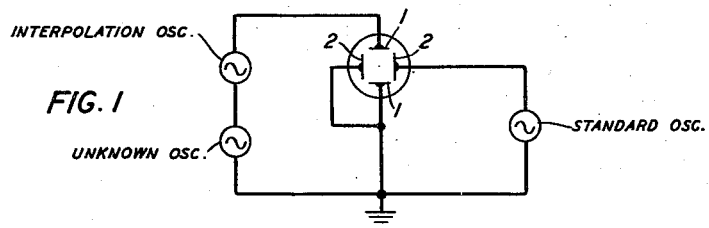
Fig. 1 illustrates in diagrammatic manner the essential organization of the invention and therefore showing in its proper relation the unknown, standard, and interpolation oscillator, and the oscilloscope or oscillograph in which the resultant wave is represented.

Fig. 1 discloses, in highly diagrammatic form, a circuit which may be used to make such a comparison. The interpolation oscillator is placed in series with the oscillator whose frequency is to be set and which is indicated in the figure as the unknown oscillator and the resultant composite wave is placed on the vertical plates 1 of the oscilloscope or oscillograph, that is, on the plates between which a vertical electrostatic field is set up. It is to be understood that a series connection of the unknown and interpolation oscillators is not essential but that any connection which produces the combination of these two waves may be used. The thousand cycle wave from the standard oscillator is similarly placed on the horizontal plates 2 of the oscilloscope or oscillograph. The interpolation oscillator is set at 11,383 cycles and the unknown oscillator adjusted until a stationary pattern similar to that illustrated by Figs. 2 and 3 is observed in the oscilloscope. Before the pattern is made to be stationary, as the desired consummation of the adjustment, two patterns will be seen, one moving from left to right and the other moving from right to left. These two patterns are similar to the "fore" and "back" trace seen when observing the usual Lissajous figure. These patterns may be separated, with a resultant simplification of the observation procedure by the use of means conventional in the use of Lissajous figures generally, such as the use of a phase splitting circuit, although usually this is not necessary.

This circuit may also be used in a converse manner when it is desired to know the frequency of an oscillator at an experimentally determined setting. In this case the unknown oscillator is left at its desired setting and the interpolation oscillator is frequency varied until a pattern is obtained.

In the above illustration a frequency of 11,383 cycles was used. However, such a pattern may be obtained by using any frequency which differs from the nearest multiple of the standard frequency by the same number of cycles as the desired frequency differs from another multiple of the standard frequency. The interpolation oscillator may be either greater or smaller than the multiple of the standard. For example, in the case given above, a pattern may be obtained with the frequency of 323,383 cycles by using an interpolation frequency of either 11,383 cycles (11,000 plus 383 cycles) or 10,617 cycles (11,000 minus 383 cycles). It is therefore necessary for the interpolation oscillator only to cover a range equal to one half the value of the frequency standard. This fact allows the frequency scale of the interpolation oscillator to be spread out by a factor of 2 to 1, but introduces the complication of having to determine whether the increment frequency is to be added or subtracted.

When it is not apparent from the calibration of the laboratory oscillator whether the increment is to be added or subtracted this ambiguity may be removed by increasing the unknown oscillator frequency by a few cycles. The interpolation oscillator is varied until the pattern is again obtained. If the interpolation frequency increases, the increment (that is the difference between the actual frequency of the interpolation oscillator and the nearest multiple of the standard) is added to the nearest calibrated point of the unknown oscillator. If the interpolation frequency decreases, the increment is subtracted.

The interpolation frequency does not need to be as low as 11,383 cycles but may be a higher frequency of the same order of magnitude as the frequency of the laboratory oscillator. Such a high frequency would have the advantage that the envelope frequency of the pattern is lower and hence the pattern is easier to spread out for observation or recording on an oscilloscope or oscillograph. However, the absolute accuracy of this method depends on the absolute accuracy with which the interpolation oscillator may be set and hence the lower interpolation frequency is desirable. By using an interpolation frequency of the order of 11,000 cycles, it is not difficult to build an interpolation oscillator having an accuracy of better than ±1 cycle. With such an oscillator it becomes possible to set a laboratory oscillator at any frequency up to well over a megacycle with an absolute accuracy of better than ±1 cycle. For frequencies a few cycles on either side of the multiples of the standard, the Lissajous figures make observation of envelope frequency difficult. In this region the frequency increment can be measured by timing the rate at which the Lissajous figure proceeds across the oscilloscope screen, using a stop watch.

In the particular system of the invention assumed by the above, and which has been found effective in use, the 11,000 to 11,500 cycle interpolation oscillator is used in conjunction with the thousand cycle standard frequency, as has been indicated, the choice of the standard frequency being governed by the fact of its general availability as a standard frequency in the building of the assignee corporation. However, at higher frequencies, say above 1 megacycle, the patterns on the oscilloscope become crowded and it becomes difficult to obtain sufficient spread to make the patterns recognizable and therefore for these frequencies an interpolation oscillator having a frequency range of 30 to 35 kilocycles has been used in conjunction with a 10 kilocycle standard frequency. The accuracy in this high range is of the order of ±10 cycles as against the accuracy of ±1 cycle in the lower frequency range above considered in detail. To facilitate the use of the circuit of the invention, the scale of the interpolation oscillator is not marked in the actual frequency but in the frequency increment. By increment is meant an amount such as the 383 cycles in the example given from which the interpolation frequency differs from an integral multiple of the standard frequency. The scale thus runs from 0 to .5 kilocycle on the low range and from 0 to 5 kilocycles on the high range. An additional set of scale markings reading from .5 to 1 kilocycle on the low range and 5 to 10 kilocycles on the high range is provided to facilitate use when the increment frequency must be subtracted. In order to obtain a scale of sufficient length so that the frequency can be read closer than 1 cycle, a film scale mechanism similar in principle to that disclosed in applicant Slonczewski's United States Patent 2,058,641, issued October 27, 1936, may be employed although it is not a part of the invention or essential in its practice, and accordingly is not shown in the drawing.

Figure 4:
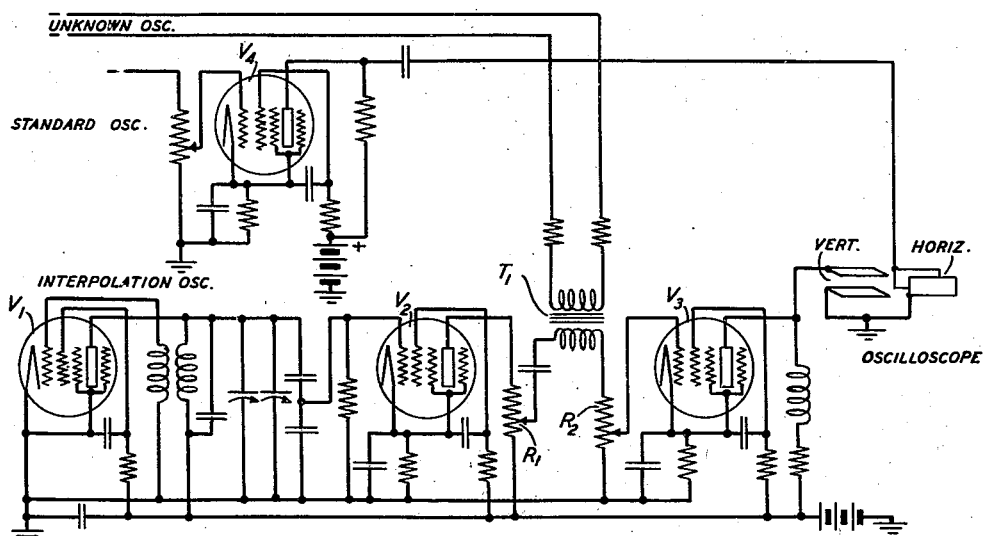

The effective carrying out of the method of the invention should contemplate its use with conventional types of oscilloscopes or oscillographs such as the 3 inch cathode ray oscilloscope. A practical system for carrying out the method would usually incorporate a mixing circuit for mixing the wave from the unknown and interpolation oscillators and two amplifiers to give additional spread on the horizontal and vertical plates of the oscilloscope, besides the interpolation and standard oscillator and circuits for the service of supply and the like. Fig. 4 illustrates in simplified form a practical embodiment of such a system or organization. Since the various elements of it are old and conventional, a The waves from the standard oscillator (not detailed description thereof is not necessary. The waves from the standard oscillator (not shown) are amplified if necessary by amplifier $V_4$ and impressed as shown on the horizontal plates of the oscilloscope shown at the right.

The unknown wave is impressed through the transformer $T_1$ on the input of $V_3$ on which tube is also impressed a wave from the interpolation oscillator $V_1$ after amplification by the buffer amplifier $V_2$. The potentiometers $R_1$ and $R_2$ serve to control the amplitudes of the two waves as impressed on the tube $V_3$ so that this tube may be adjusted for optimum operation conditions. The output wave of tube $V_3$ is impressed on the vertical plates of a cathode ray oscilloscope. The tube $V_3$ is not essential, and, if used, its function in nowise corresponds to the function of a modulator, but is only to increase the sensitivity of the oscilloscope by functioning much as a distortionless amplifier.

The combination of the two frequencies may take place in a circuit such as shown in Fig. 4 or in any suitable circuit which will combine these waves without introducing serious distortion. Such a circuit might consist of a parallel combination through suitable networks or the two frequencies might even each be connected to different grids in a multigrid vacuum tube, the tube being operated as a linear device.

While the invention has been described in connection with a particular embodiment, certain variations have been suggested and it is to be understood that many additional variations are possible within the scope of the invention, as the invention is to be defined in the appended claims.

What is claimed is:

1. The method of measuring an unknown frequency, using a standard frequency source and a source of calibrated interpolating frequency, which comprises the steps of arithmetically combining the unknown frequency wave with the wave from the interpolating source and adjusting the interpolating frequency until it differs from an integral multiple of the standard frequency by the same amount as the unknown frequency differs from another integral multiple of said frequency, whereby the unknown frequency may be calculated from said difference and the known integral multiple frequencies.

2. A method of measuring an unknown frequency using a standard frequency source, a source of calibrated interpolating frequency, and an oscilloscopic device capable of indicating by a screen pattern the frequency relation of waves separately impressed thereon, which comprises the steps of arithmetically combining the unknown frequency wave with the interpolating wave in such manner as to make possible a resultant wave having an envelope frequency equal to a multiple of the standard frequency, impressing the combined wave and the wave from the standard source on the oscilloscopic device and adjusting the interpolating frequency until said envelope frequency is an integral multiple of the standard frequency, as determined by the production of a stationary pattern on the oscilloscope whereby the unknown frequency may be calculated from said difference and the known integral multiple frequencies.

3. A method of measuring an unknown frequency, using a standard frequency source, a source of calibrated interpolating frequency, and an oscilloscope, which comprises the steps of adding the unknown frequency wave and the wave from the interpolation source whereby to obtain a resultant wave having an envelope frequency which is a function of the difference of the two frequencies concerned, impressing the resultant wave on a pair of plates of the oscilloscope, impressing the wave from the standard source on the other pair of oscilloscope plates, and adjusting the interpolating frequency until a stationary pattern appears on the oscilloscope screen, whereby the unknown frequency may be calculated as a function of the interpolating and standard frequencies.

4. A method of measuring an unknown frequency, using a standard frequency wave, a source of calibrated interpolating frequency and an oscilloscope, which comprises the steps of adding the unknown frequency wave and the interpolating wave, impressing the resultant wave on the vertical plates of the oscilloscope, impressing the standard frequency wave on the horizontal plates of the oscilloscope and adjusting the interpolating frequency until a stationary pattern appears on the oscilloscope screen, whereby the unknown frequency may be calculated from the difference between the actual interpolation frequency and the nearest multiple of the standard frequency.

5. The method specified in claim 4 including the additional steps, to enable the operator to know whether the said difference frequency should be added or subtracted in the determination of the unknown frequency, of increasing the unknown frequency by a few cycles after the pattern has been made stationary, and then again varying the interpolating frequency until the pattern is again made stationary, whereupon if the interpolating frequency had to be increased, the difference frequency should be added and if the interpolating oscillator frequency had to be decreased, the difference frequency should be subtracted.

6. The method specified in claim 4, as adapted to the setting of a frequency corresponding to the unknown frequency of said claim 4 to a given value as distinguished from measuring the unknown frequency, which comprises varying the operation there specified by setting the frequency of the interpolation oscillator and adjusting the frequency of the unknown oscillator accordingly until the image is stationary.

THADDEUS SLONCZEWSKI.
FRANK R. STANSEL.